(12) United States Patent
Takai et al.

(10) Patent No.: US 7,634,856 B2
(45) Date of Patent: Dec. 22, 2009

(54) METHOD OF ASSEMBLING GAS FLOW CONTROL VALVE

(75) Inventors: Katsunori Takai, Tokyo (JP); Sotsuo Miyoshi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 882 days.

(21) Appl. No.: 10/543,779

(22) PCT Filed: Oct. 25, 2004

(86) PCT No.: PCT/JP2004/015802

§ 371 (c)(1),
(2), (4) Date: Jul. 29, 2005

(87) PCT Pub. No.: WO2005/054728

PCT Pub. Date: Jun. 16, 2005

(65) Prior Publication Data
US 2006/0075635 A1 Apr. 13, 2006

(30) Foreign Application Priority Data
Dec. 4, 2003 (JP) .............................. 2003-406270

(51) Int. Cl.
| B21D 39/00 | (2006.01) |
| B23P 9/00 | (2006.01) |
| B23P 11/00 | (2006.01) |
| A01G 25/16 | (2006.01) |
| F02B 47/08 | (2006.01) |
| F16K 43/00 | (2006.01) |

(52) U.S. Cl. ...................... 29/890.124; 29/434; 29/445; 29/505; 29/517; 29/520; 29/890.122; 123/568.2; 137/614.21; 137/625; 251/355

(58) Field of Classification Search ................... 29/434, 29/445, 505, 517, 520, 890.13, 890.122, 29/890.124; 123/568.19, 568.2; 137/450, 137/614.21, 625; 251/355
See application file for complete search history.

(56) References Cited

U.S. PATENT DOCUMENTS
4,318,422 A * 3/1982 Nakanishi et al. ........... 137/246
6,279,552 B1 * 8/2001 Okada et al. .............. 123/568.2

FOREIGN PATENT DOCUMENTS
| JP | 49-45532 B1 | 12/1974 |
| JP | 11-182355 A | 7/1999 |
| JP | 11-324823 A | 11/1999 |
| JP | 2001-99014 A | 4/2001 |
| WO | WO 99/61775 A1 | 12/1999 |

* cited by examiner

*Primary Examiner*—David P Bryant
*Assistant Examiner*—Alexander P Taousakis
(74) *Attorney, Agent, or Firm*—Sughrue Mion, PLLC

(57) ABSTRACT

An assembly method includes a step of press-fitting a second valve 27 to a valve shaft 29 to which a first valve 25 is press-fitted and secured while measuring and adjusting a distance L2 so that it becomes equal to a distance L1. Thus, the first valve 25 and second valve 27 are press-fitted to the valve shaft 29 and those components are swaged together so that the first and second valves are secured to the valve shaft, and oil is placed in a press-fitted portion. When components, such as the first valve 25, are sintered parts, oil contained in the sintered parts themselves is used for increasing a joining force that occurs in the press-fitted portion.

14 Claims, 9 Drawing Sheets

METHOD OF ASSEMBLING GAS FLOW CONTROL VALVE

FIELD OF THE INVENTION

The present invention relates to an assembly method of assembling a double-valve-type gas-mass-flow control valve. More particularly, it relates to an assembly method of assembling a double-valve-type gas-mass-flow control valve which is to be arranged in an exhaust gas recirculating path via which an exhaust gas from the combustion chamber of an internal combustion engine (referred to as an engine from here on), such as a diesel engine or a gasoline engine, is returned to the combustion chamber.

BACKGROUND OF THE INVENTION

Conventionally, double-valve-type exhaust gas recirculating valves disclosed by patent reference 1, patent reference 2, patent reference 3, etc. are known as double-valve-type gas-mass-flow control valves. A double-valve-type exhaust gas recirculating valve is provided with a valve housing which can be connected with an exhaust gas recirculating path of an internal combustion engine and which has both an inlet for accepting an exhaust gas discharged from the combustion chamber of the above-mentioned internal combustion engine, and an outlet for returning the exhaust gas to the above-mentioned combustion chamber, a primary channel formed in the vicinity of the above-mentioned inlet within the valve housing, two secondary channels which branch from the primary channel and are communicated with the above-mentioned outlet, first and second channel openings which are formed between those secondary channels and the above-mentioned primary channel, respectively, first and second valves which open or close the two above-mentioned channel openings simultaneously by way of valve seats disposed in the two channel openings, respectively, and a valve shaft having the first and second valves, and an actuator that causes this valve shaft to reciprocate in a direction of an axis of the above-mentioned valve housing.

There is a possibility that in such the double-valve-type exhaust gas recirculating valve, the exhaust gas may leak from either or both of the two channel openings unless the two valves are simultaneously and certainly placed on the valve seats disposed in the two channel openings at an ordinary temperature, respectively. That is, except when the distance between the two valves is completely equal to the distance between the two valve seats, the exhaust gas certainly leaks from either or both of the two channel openings. In order to reduce the amount of leakage of the exhaust gas (referred to as the amount of valve seat leakage from here on) to zero, there have been demands for a high degree of accuracy of dimension on components, such as the valves and valve seats.

In related art double-valve-type exhaust gas recirculating valves, components, such as the valves and valve seats, are manufactured with form turning in order to satisfy demands for a high degree of accuracy of dimension. A problem with related art double-valve-type exhaust gas recirculating valves is however that while the manufacture of components with from turning can raise the accuracy of dimension, it needs a long manufacturing time and causes increase in the manufacturing cost. In addition, in the case of manufacturing the above-mentioned components with form turning, since there are variations in the positions of the above-mentioned components which are assembled into a product, large variations may occur in the distance between the valves. A problem is that it is therefore difficult to reduce specs of a desired value of the amount of valve seat leakage, and an exhaust gas recirculating valve handling an exhaust gas of a small flow rate does not encounter much trouble, whereas an exhaust gas recirculating valve handling an exhaust gas of a large flow rate which is to be mounted in a diesel engine or the like encounters a large change in the amount of leakage in a valve seat even if the clearance between the valve seat and the corresponding valve is small.

On the other hand, there can be provided a method of manufacturing components, such as valves and valve seats, using sintering machining at a low cost. However, components manufactured with sintering machining have a low degree of accuracy of dimension, and must be therefore ready for a considerable amount of valve seat leakage when assembled into a valve housing.

Patent reference 1: International patent application WO 99/61775

Patent reference 2: JP,11-182355,A

Patent reference 3: JP,11-324823,A

The present invention is made in order to overcome the drawbacks of a gas-mass-flow control valve, such as a related art double-valve-type exhaust gas recirculating valve, and it is therefore an object of the present invention to provide an assembly method of assembling a gas-mass-flow control valve at a low cost, which makes it possible to adjust the amount of valve seat leakage with a high degree of accuracy.

DISCLOSURE OF THE INVENTION

In accordance with the present invention, there is provided an assembly method of assembling a gas-mass-flow control valve including a valve housing having an inlet for accepting a gas and an outlet for discharging the gas, a primary channel formed in the above-mentioned valve housing in a vicinity of the above-mentioned inlet, two secondary channels that branch off from the above-mentioned primary channel and that are communicated with the above-mentioned outlet, first and second channel openings that are formed between the above-mentioned two secondary channels and the above-mentioned primary channel, respectively, first and second valves that open or close the above-mentioned two channel openings simultaneously by way of first and second valve seats which are disposed in the above-mentioned two channel openings, respectively, a valve shaft having the above-mentioned first and second valves, and an actuator that causes the above-mentioned valve shaft to reciprocate in a direction of an axis of the above-mentioned valve housing, the above-mentioned assembly method comprising the steps of: press-fitting the above-mentioned first valve seat to a valve seat press-fitted portion of the above-mentioned first channel opening on a side of the above-mentioned actuator; placing oil between an outer surface of a first large-diameter portion of the above-mentioned valve shaft and an inner surface of the above-mentioned first valve; press-fitting the above-mentioned first valve to the above-mentioned first large-diameter portion of the above-mentioned valve shaft; measuring a distance L1 between a position of the above-mentioned first valve on a side of the above-mentioned primary channel and a position of a valve seat press-fitted portion of the above-mentioned second channel opening on a side of the above-mentioned primary channel in a state in which the above-mentioned valve shaft to which the above-mentioned first valve is press-fitted is temporarily incorporated into the above-mentioned valve housing so that the above-mentioned first valve is adhered to the above-mentioned first valve seat; placing oil between an outer surface of a second large-diameter portion of the above-mentioned valve shaft and an inner surface of the above-mentioned second valve after taking out the above-mentioned valve shaft from the above-mentioned valve housing; while measuring a distance L2 between a position corresponding to the above-mentioned first valve on the side of the above-mentioned primary channel and a position corresponding to the above-mentioned second valve seat on the side of the above-mentioned primary channel, press-fitting the above-mentioned second valve to the above-mentioned second large-diameter portion of the above-mentioned valve shaft in a state in which the above-mentioned second valve seat is placed in the above-mentioned second large-diameter portion of the above-mentioned valve shaft so that the above-mentioned distance L2 becomes equal to the above-mentioned distance L1, only when an amount of leakage in the above-mentioned second valve seat at ordinary temperatures is set to 0; press-fitting the above-mentioned second valve seat to the above-mentioned valve seat press-fitted portion of the above-mentioned second channel opening which is distant from the above-mentioned actuator; and incorporating the above-mentioned valve shaft into the above-mentioned valve housing.

As previously mentioned, since the assembly method includes the steps of: press-fitting the above-mentioned first valve seat to a valve seat press-fitted portion of the above-mentioned first channel opening on a side of the above-mentioned actuator; placing oil between an outer surface of a first large-diameter portion of the above-mentioned valve shaft and an inner surface of the above-mentioned first valve; press-fitting the above-mentioned first valve to the above-mentioned first large-diameter portion of the above-mentioned valve shaft; measuring a distance L1 between a position of the above-mentioned first valve on a side of the above-mentioned primary channel and a position of a valve seat press-fitted portion of the above-mentioned second channel opening on a side of the above-mentioned primary channel in a state in which the above-mentioned valve shaft to which the above-mentioned first valve is press-fitted is temporarily incorporated into the above-mentioned valve housing so that the above-mentioned first valve is adhered to the above-mentioned first valve seat; placing oil between an outer surface of a second large-diameter portion of the above-mentioned valve shaft and an inner surface of the above-mentioned second valve after taking out the above-mentioned valve shaft from the above-mentioned valve housing; while measuring a distance L2 between a position corresponding to the above-mentioned first valve on the side of the above-mentioned primary channel and a position corresponding to the above-mentioned second valve seat on the side of the above-mentioned primary channel, press-fitting the above-mentioned second valve to the above-mentioned second large-diameter portion of the above-mentioned valve shaft in a state in which the above-mentioned second valve seat is placed in the above-mentioned second large-diameter portion of the above-mentioned valve shaft so that the above-mentioned distance L2 becomes equal to the above-mentioned distance L1, only when an amount of leakage in the above-mentioned second valve seat at ordinary temperatures is set to 0; press-fitting the above-mentioned second valve seat to the above-mentioned valve seat press-fitted portion of the above-mentioned second channel opening which is distant from the above-mentioned actuator; and incorporating the above-mentioned valve shaft into the above-mentioned valve housing, the assembly method offers an advantage of being able to adjust the amount of valve seat leakage in each of the first and second valves with a high degree of accuracy even when components, such as the valves and valve seats, are manufactured by using sintering machining or the like with low cost, but a low degree of accuracy of dimension compared with form turning, thereby remarkably improving the reliability of the gas-mass-flow control valve.

Therefore, the present embodiment offers another advantage of being able to accommodate variations in the size of each of the components, such as the valves and valve seats, and errors that occur in the assembly of these components, and therefore to use the components just as they are even if they are manufactured with a low degree of accuracy of dimension by using sintering machining or the like, thereby improving the yields of the gas-mass-flow control valve.

According to the present invention, the valves are press-fitted to the valve shaft. Therefore, the present invention offers a further advantage of being able to suitably adjust the positions where the valves are secured to the valve shaft, respectively, so as to adjust the amount of valve seat leakage in each of the valves according to the use of the gas-mass-flow control valve even when the gas-mass-flow control valve is applied to a diesel engine in which there is a large difference in pressure between the inlet and outlet of each valve and there is a relatively large flow rate of exhaust gas or even when the gas-mass-flow control valve is applied to a gasoline engine in which there is a relatively small flow rate of exhaust gas.

According to the present invention, oil is placed between the valve shaft and each of the valves when each of the valves is press-fitted to the valve shaft. Therefore, the oil serves as lubrication which prevents galling between the valve shaft and each of the valves during the press-fitting step. Especially, in a case where the gas-mass-flow control valve is an exhaust gas recirculating one, the hot exhaust gas causes the oil to evaporate when recirculated, and the evaporated oil causes baking in the press-fitted portion of the valve shaft to which each of the valves is press-fitted. The present invention thus offers a still further advantage of being able to increase a joining force that occurs in the press-fitted portion.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
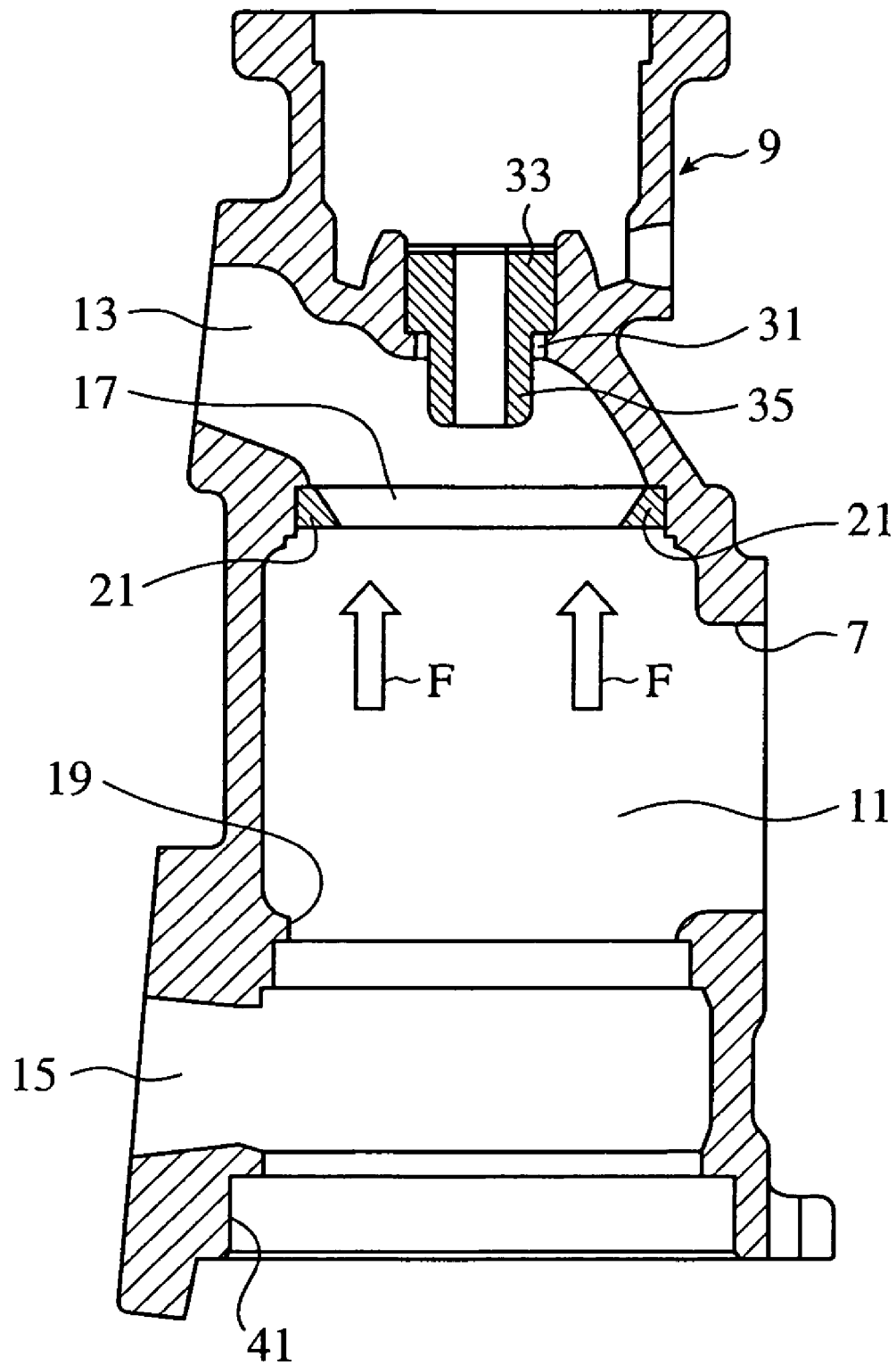
FIG. 1 is a cross-sectional view showing a step of press-fitting a first valve seat to a valve housing, which is a step of an assembly method of assembling an exhaust gas recirculating valve in accordance with embodiment 1 of the present invention.
Figure 2:
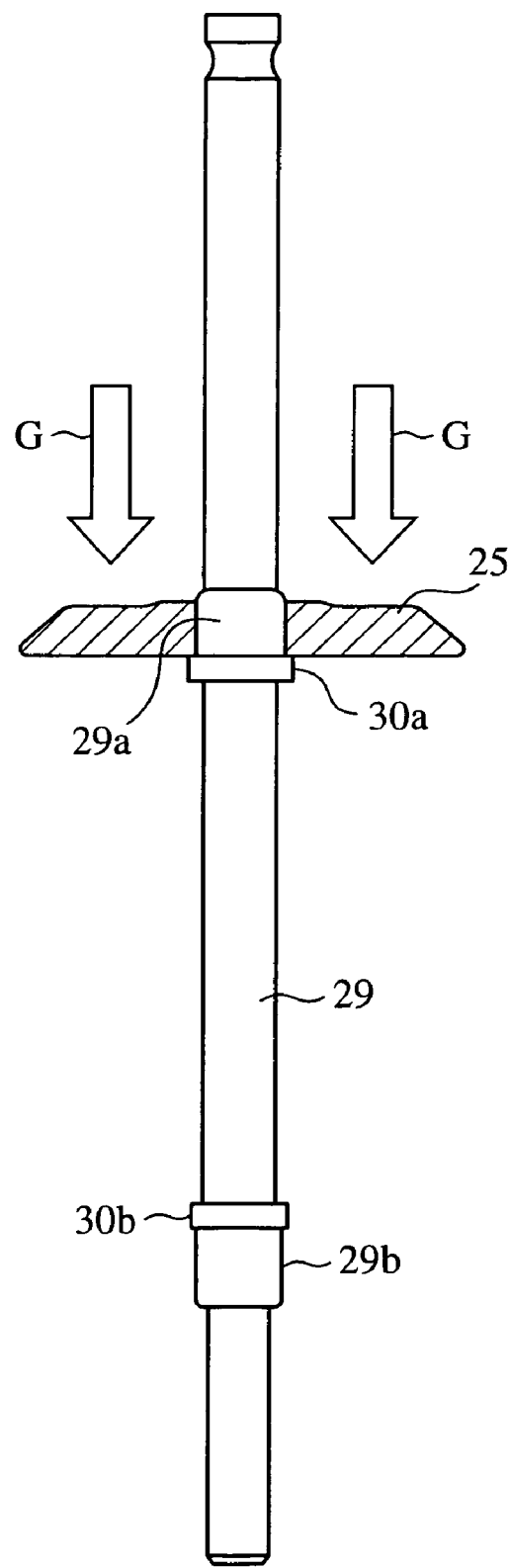
FIG. 2 is an front elevation showing a step of press-fitting a first valve to a valve shaft which is carried out after the step, as shown in FIG. 1, of press-fitting the first valve seat to the valve housing.
Figure 3:
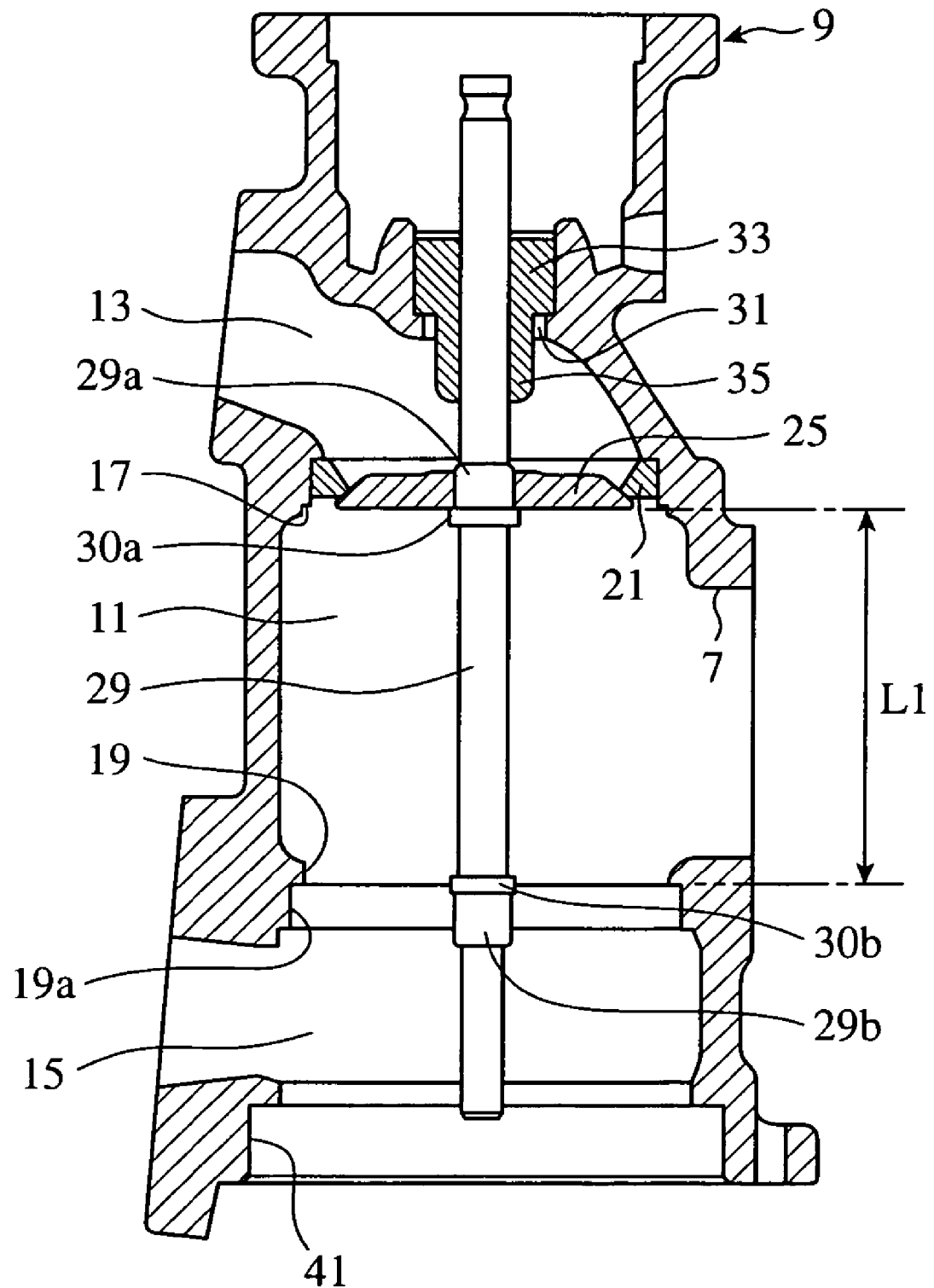
FIG. 3 is a cross-sectional view showing a step of measuring a distance (L1) between a lower end of the first valve and an upper end of a second valve seat press-fitted portion, which is carried out after the swaging step as shown in FIG. 2, in a state in which the valve shaft to which the first valve is press-fitted and swaged is temporarily incorporated into the valve housing to which the first valve seat is press-fitted so that the first valve is adhered to the first valve seat.
Figure 4:
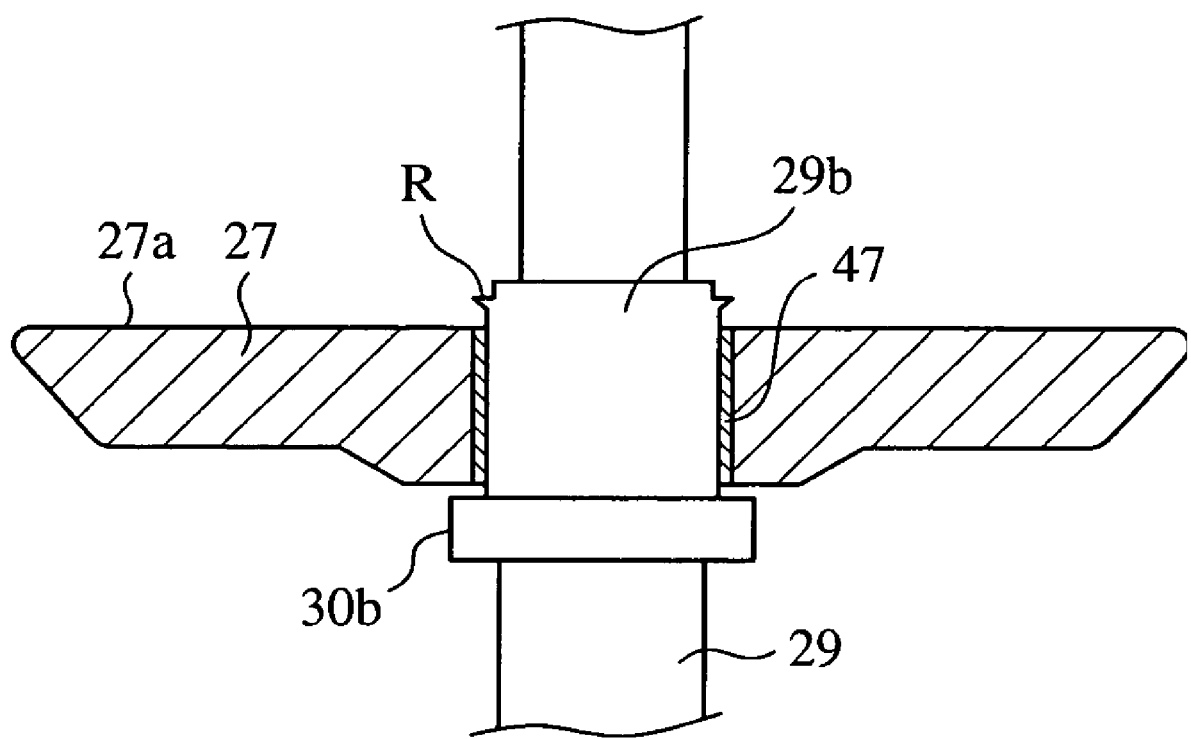
FIG. 4 is an enlarged front elevation showing a step of placing oil between a second valve and a second large-diameter portion of the valve shaft, which is carried out after the measuring step as shown in FIG. 3.
Figure 5:
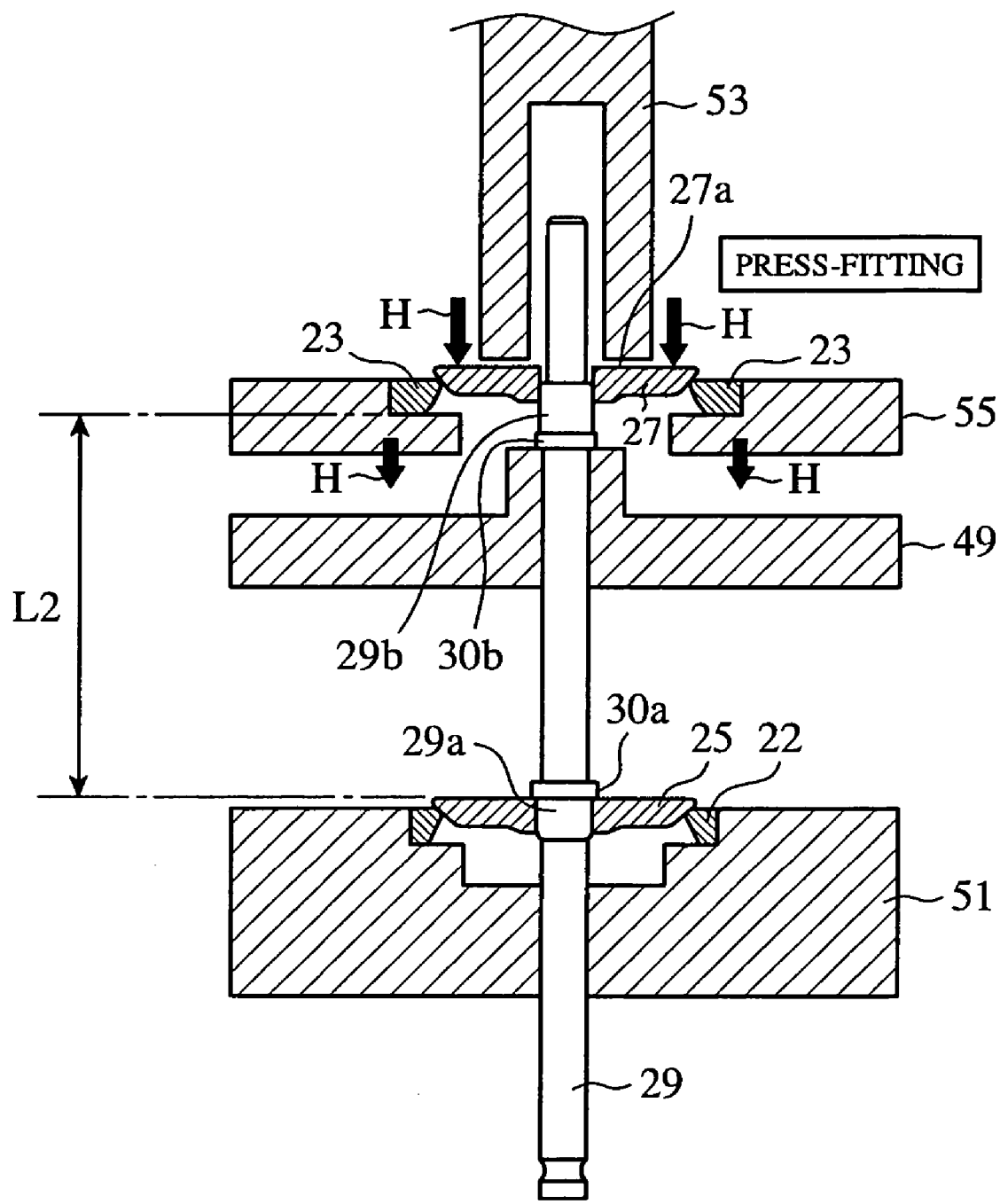
FIG. 5 is a cross-sectional view showing a step of press-fitting the second valve to the valve shaft while measuring a distance (L2) between the lower end of the first valve and an upper end of a second valve seat, which is carried out after the oil placing step as shown in FIG. 4.
Figure 6:
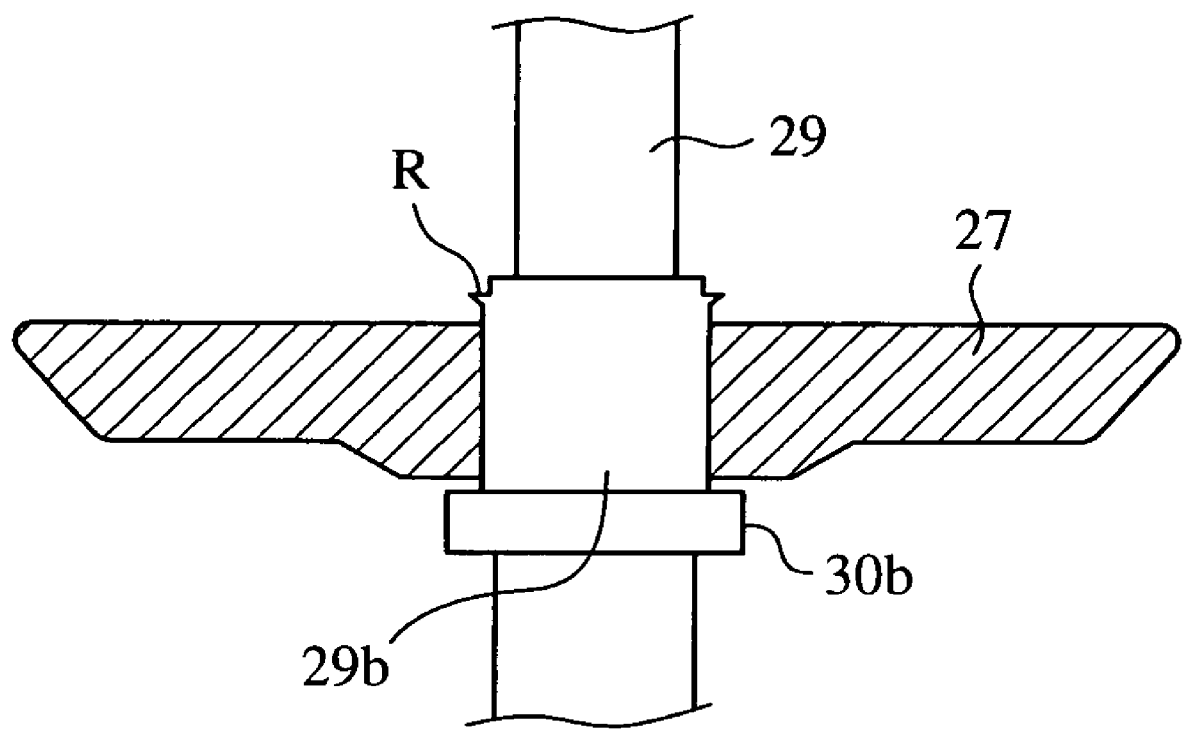
FIG. 6 is a front elevation showing a step of swaging the first valve which is carried out after the press-fitting step as shown in FIG. 5.
Figure 7:
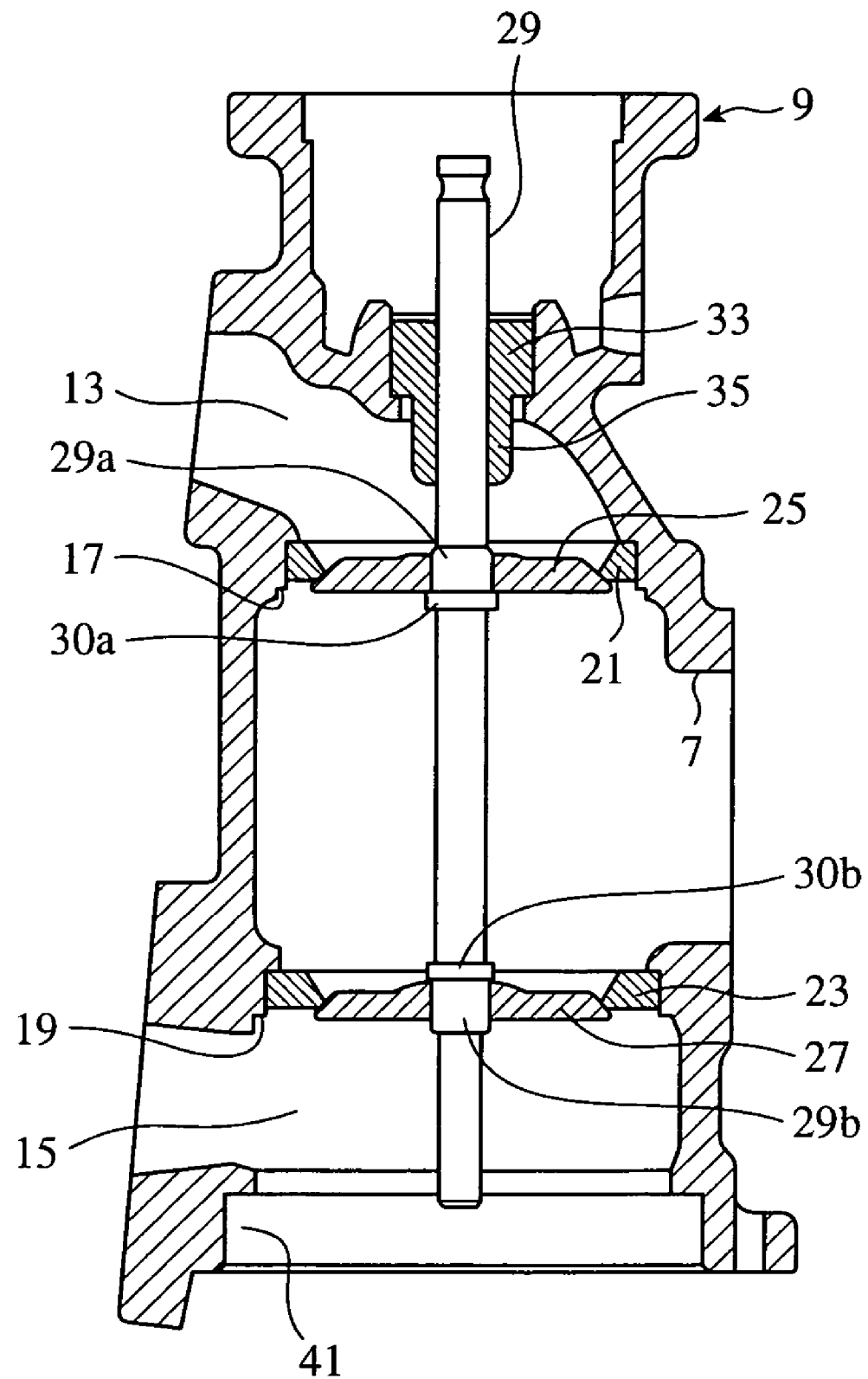
FIG. 7 is a cross-sectional view showing a step of mounting the valve shaft provided with the two valves to the valve housing, and then adjusting the amount of leakage in each of the valve seats, which is carried out after the press-fitting step as shown in FIG. 6.
Figure 8:
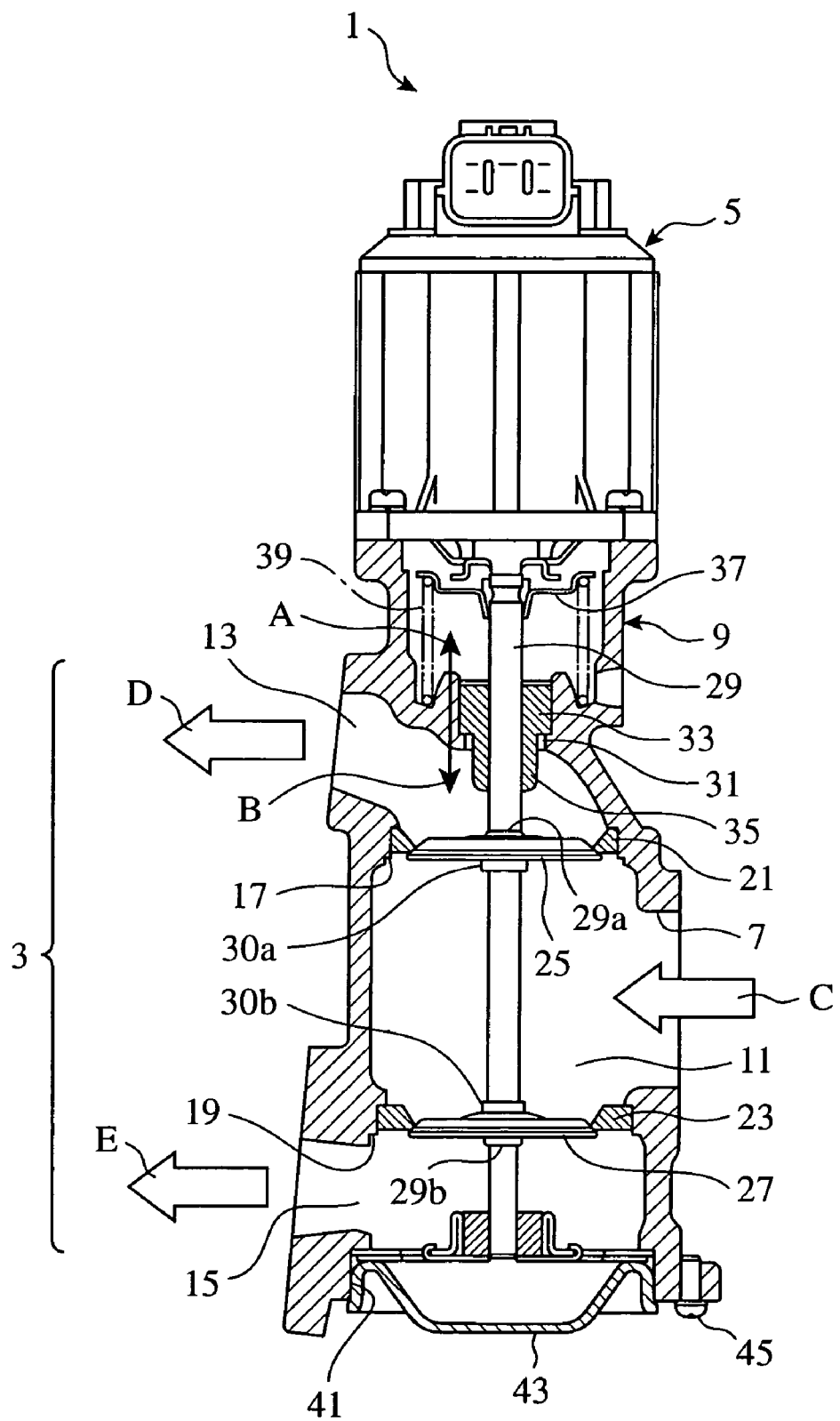
FIG. 8 is a partially sectional view showing a step of incorporating other components, such as an actuator, into the valve housing so as to obtain a finished product, which is carried out after the mounting step as shown in FIG. 7.

FIG. 1 is a cross-sectional view showing a step of press-fitting a first valve seat to a valve housing, which is a step of an assembly method of assembling an exhaust gas recirculating valve in accordance with embodiment 1 of the present invention, so as to adjust below-mentioned distances L1 and L2 so that they are equal to each other, thereby reducing the amount of leakage in the valve seat at ordinary temperatures to 0, FIG. 2 is an front elevation showing a step of press-fitting a first valve to a valve shaft which is carried out after the step, as shown in FIG. 1, of press-fitting the first valve seat to the valve housing, FIG. 3 is a cross-sectional view showing a step of measuring the distance (L1) between a lower end of the first valve and an upper end of a second valve seat press-fitted portion, which is carried out after the swaging step as shown in FIG. 2, in a state in which the valve shaft to which the first valve is press-fitted and swaged is temporarily incorporated into the valve housing to which the first valve seat is press-fitted so that the first valve is adhered to the first valve seat, FIG. 4 is an enlarged front elevation showing a step of placing oil between a second valve and a second large-diameter portion of the valve shaft, which is carried out after the measuring step as shown in FIG. 3, FIG. 5 is a cross-sectional view showing a step of press-fitting the second valve to the valve shaft while measuring the distance (L2) between the lower end of the first valve and an upper end of a second valve seat, which is carried out after the oil placing step as shown in FIG. 4, FIG. 6 is an front elevation showing a step of swaging the first valve which is carried out after the press-fitting step as shown in FIG. 5, FIG. 7 is a cross-sectional view showing a step of mounting the valve shaft provided with the two valves to the valve housing, and then checking the amount of leakage in each of the valve seats, which is carried out after the press-fitting step as shown in FIG. 6, and FIG. 8 is a partially sectional view showing a step of incorporating other components, such as an actuator, into the valve housing so as to obtain a finished product, which is carried out after the mounting step as shown in FIG. 7. In each of the above-mentioned drawings except FIGS. 5 and 6, for convenience' sake, a side of the valve housing in the vicinity of the actuator is referred to as an upper side, and a side of the valve housing which is far from the actuator is referred to as a lower side. In FIGS. 5 and 6, the valve shaft is shown in a state in which it is inverted.

In this embodiment 1, the structure of the exhaust gas recirculating valve disposed as a gas-mass-flow control valve is explained first, and, after that, the assembly method of assembling the exhaust gas recirculating valve is explained in detail.

As shown in FIG. 8, the exhaust gas recirculating valve (i.e., the gas-mass-flow control valve) 1 is substantially comprised of a valve member 3 and the actuator 5, such as a DC motor, arranged above the valve member 3.

The valve member 3 is substantially comprised of the valve housing 9 having both an inlet 7 for accepting an exhaust gas from a combustion chamber (not shown) of an engine (not shown), and an outlet (not shown) for returning the exhaust gas to the above-mentioned combustion chamber (not shown), a primary channel 11 formed in a vicinity of the above-mentioned inlet 7 and within the valve housing 9, an upper secondary channel 13 and a lower secondary channel 15 which branch off from the primary channel 11 and which are communicated with the above-mentioned outlet (not shown), a first channel opening 17 and a second channel opening 19 which are formed between the upper secondary channel 13 and lower secondary channel 15 and the above-mentioned primary channel 11, respectively, the first valve 25 and second valve 27 which simultaneously open or close the above-mentioned first and second channel openings 17 and 19 by way of the first valve seat 21 and second valve seat 23 which are disposed in the first and second channel openings 17 and 19, respectively, and the valve shaft 29 having the first and second valves 25 and 27. The valve shaft 29 can be moved in a direction of an axis of the valve housing 9 (i.e., a direction of an arrow B) by the actuator 5.

A first large-diameter portion 29a which allows press-fitting of the first valve 25 thereto, and the second large-diameter portion 29b which allows press-fitting of the second valve 27 thereto are formed at predetermined positions of the valve shaft 29. The diameter of a central hole of the first valve 25 and the outside diameter of the first large-diameter portion 29a are determined respectively in consideration of parts reserved for press-fitting which are required for providing a predetermined press-fitting pressure. Similarly, the diameter of a central hole of the second valve 27 and the outside diameter of the second large-diameter portion 29b are determined respectively in consideration of parts reserved for press-fitting which are required for providing a predetermined press-fitting pressure. In order to prevent axial movements of the first valve 25, a first valve stopper 30a having a larger outside diameter than the first large-diameter portion 29a is formed in the first large-diameter portion 29a so that it is located below this first large-diameter portion 29a. Similarly, in order to prevent axial movements of the second valve 27, a second valve stopper 30b having a larger outside diameter than the second large-diameter portion 29b is formed in the second large-diameter portion 29b so that it is located above this second large-diameter portion 29b.

A penetrating hole 31 is formed in an upper portion of the upper secondary channel 13 and within the valve housing 9 so as to penetrate an inner wall of the valve housing and run in the direction of the axis of the valve housing 9, and a bush 33 and a filter 35 are attached into this penetrating hole 31. The valve shaft 29 can slide along the central hole of the bush 33 and filter 35 in the direction of the axis of the valve housing. A spring bearing 37 is secured to an upper end of the valve shaft 29, and a compression spring 39 that always energizes the valve shaft 29 in an direction of an arrow A is disposed between the spring bearing 37 and the valve housing 9. The first and second valves 25 and 27 secured to the valve shaft 29 which is energized by the compression spring 39 are so constructed as to simultaneously close the above-mentioned first and second channel openings 17 and 19 by way of the first and second valve seats 21 and 23, respectively.

An opening for part assembly 41 is formed in a lower portion of the lower secondary channel 15 and within the valve housing 9 so as to penetrate a lower wall of the valve housing and run in the direction of the axis of the valve housing, and a blocking member 43 can be attached to the opening for part assembly 41 with screws 45.

Next, the operation of the exhaust gas recirculating valve 1 in accordance with this embodiment of the present invention will be explained.

When the exhaust gas is discharged from the combustion chamber (not shown) of the engine (not shown) in a state (i.e., a valve-closing state) in which the first and second valves 25 and 27 of the valve shaft 29 have been placed on the first and second valve seats 21 and 23, respectively, and have closed simultaneously the above-mentioned first and second channel openings 17 and 19, respectively, the actuator 5 drives the valve shaft 29 so as to cause it to move toward a direction of an arrow B against the energizing force by the compression spring 39. At this time, a clearance is formed between the first valve 25 and the first valve seat 21, and a clearance is also formed between the second valve 27 and the second valve seat 23, so that the first and second valves 25 and 27 enter a valve-opening state. The exhaust gas then goes into the upper secondary channel 13 and lower secondary channel 15 through the two above-mentioned clearances, flows in both a direction of an arrow D and a direction of an arrow E, joins at the outlet (not shown), and is returned to the combustion chamber (not shown) of the engine (not shown) again.

Next, the assembly method of assembling the exhaust gas recirculating valve 1 will be explained.

First, as shown in FIG. 1, after the bush 33 and filter 35 are attached into the penetrating hole 31 of the valve housing 9, the first valve seat 21 is press-fitted and attached to the first channel opening 17 from a direction of an arrow F.

Next, oil is placed between the outer surface of the first large-diameter portion 29a of the valve shaft 29, and the inner surface of the first valve 25. The oil serves as lubrication which prevents galling between the two components during the below-mentioned press-fitting step at ordinary temperatures when the exhaust gas recirculating valve is assembled. The hot exhaust gas causes the oil to evaporate, and the evaporated oil causes baking in the press-fitted portion of the valve shaft to which the first valve is press-fitted, so that a joining force that occurs in the press-fitted portion is increased. It is desirable that the oil is provided to the gap between the two components by using an appropriate method, such as a method of applying the oil to the gap. In a case where components, such as the first valve 25, are sintered ones, it is also possible to use oil contained in the sintered components themselves. That is, the oil contained in the sintered components is baked by the hot exhaust gas so that the valve shaft 29 can be integral with the first valve 25.

Then, as shown in FIG. 2, the first valve 25 is press-fitted to the first large-diameter portion 29a of the valve shaft 29, which has not been incorporated into the valve housing 9 yet, using a press-fitting machine, such as a servo pressing machine. The press-fitting pressure and the amount of press-fitting in this press-fitting step are suitably determined according to the premeasured-dimension of each of components, such as the valve. As a result, it is possible to certainly prevent the manufacture of nonstandard products having malfunctions such as galling which occurs due to provision of too-large parts reserved for press-fitting, and backlash and slack which occur due to provision of too-small parts reserved for press-fitting. It is also possible to arbitrarily determine the position where the first valve 25 is press-fitted to the valve shaft by adjusting the amount of press-fitting.

After the above-mentioned press-fitting step is carried out, an upper part (or a part) of the first large-diameter portion 29a of the valve shaft 29, i.e., a portion which is distant from the first valve stopper 30a located under the first large-diameter portion and is exposed from the first valve 25 even after the first valve 25 is press-fitted to the first large-diameter portion is swaged in a direction of an axis of the valve shaft. The swaging has to be done to such an extent that a deformed part (not shown) of the first large-diameter portion 29a which has become deformed because of this swaging is not brought into contact with the first valve 25. As a result, when the deformed part (not shown) of the first large-diameter portion 29a which has become deformed because of the swaging is brought into contact with the first valve 25, any displacement of the position where the first valve 25 is press-fitted to the valve shaft in the direction of the axis of the valve shaft (i.e., the direction of the swaging) can be prevented. Therefore, the first valve 25 is prevented from disconnecting in an upward direction from the first large-diameter portion by the deformed part (not shown) of the first large-diameter portion 29a which has become deformed because of the swaging, and is also prevented from disconnecting in a downward direction from the first large-diameter portion by the first valve stopper 30a.

Next, as shown in FIG. 3, the valve shaft 29 to which the first valve 25 is press-fitted is temporarily incorporated into the valve housing 9 by way of the opening for part assembly 41. That is, the valve shaft 29 is inserted into the central holes of the bush 33 and filter 35, while the first valve 25 is adhered to the first valve seat 21 which is press-fitted to the first channel opening 17. In this state, the distance L1 between the lower end (i.e., a position on a side of the primary channel) of the first valve 25 and the upper end (i.e., a position on a side of the primary channel) of the second valve seat press-fitted portion 19a of the second channel opening 19 is measured.

Then, after the above-mentioned valve shaft 29 is taken out from the valve housing 9, an oil layer 47 is placed between the outer surface of the second large-diameter portion 29b of the valve shaft 29, and the inner surface of the second valve 27, as shown in FIG. 4. This oil placing step is the same as the oil placing step of placing oil between the first large-diameter portion 29a and the first valve 25. When components, such as the second valve 27, are sintered ones, it is also possible to use oil contained in the sintered components themselves for integrating the valve shaft 29 and second valve 27 into one component.

Next, as shown in FIG. 5, while the valve shaft 29 is inverted, it is secured to a first jig 49 and a second jig 51. The first jig 49 simultaneously supports both the outer surface of the second valve stopper 30b of the valve shaft 29, and the outer surface of part of the valve shaft in the vicinity of the second valve stopper. While the second jig supports the first valve 25 press-fitted to the first large-diameter portion 29a of the valve shaft 29 by way of the valve seat 22 having the same shape and size as the first valve seat 21, the second jig also supports the outer surface of part of the valve shaft in the vicinity of the first large-diameter portion 29a.

Next, the second valve 27 is press-fitted to the second large-diameter portion 29b of the valve shaft 29, which is supported by the first and second jigs 49 and 51, along a direction of an arrow H by using the servo pressing machine 53. At this time, the edge portion of an upper surface (i.e., a surface shown on a lower side in FIG. 5) of the second valve 27 is supported by the second valve seat 23 secured to a third jig 55, and the third jig 55 is disposed so that it can move in the direction of the arrow H together with the servo pressing machine 53 which presses a lower surface (i.e., a surface shown on an upper side in FIG. 5) 27a of the second valve 27.

In this press-fitting step, while the distance L2 between the lower end (i.e., the position corresponding to the side of the primary channel) of the first valve 25 of the valve shaft 29 and the upper end (i.e., the position corresponding to the side of the primary channel) of the second valve seat 23 is measured, the press-fitting pressure and amount of press-fitting are adjusted so that the distance L2 becomes equal to the above-mentioned distance L1 and the second valve 27 is press-fitted to the second large-diameter portion 29b of the valve shaft 29. During this press-fitting step, by increasing parts reserved for the press-fitting and the length of the press-fitted portion, the press-fitted portion can be enlarged and the joining force that occurs in the press-fitted portion can be increased.

Since the above-mentioned valve seat 22 is located outside two or more components which determine the distance L2, any valve seat can be used in place of the valve seat 22 if it has the same shape and same size as the first valve seat 21 without removing the first valve seat 21 actually incorporated into the valve housing 9, and the determination of the above-mentioned distance L2 is not affected at all.

Next, as shown in FIG. 6, after the servo pressing machine 53 and third jig 55 shown in FIG. 5 are removed from the valve shaft 29, a lower part (i.e., part) of the second large-diameter portion 29b of the valve shaft 29, i.e., a part which is distant from the second valve stopper 30b located on an upper side of the second large-diameter portion and which is exposed after the second valve 27 is press-fitted to the second large-diameter portion is swaged in the direction of the axis of the valve shaft. The swaging has to be done to such an extent that a deformed part R of the second large-diameter portion 29b which has become deformed because of this swaging is not brought into contact with the second valve 25. As a result, when the deformed part R of the second large-diameter portion 29b which has become deformed because of the swaging is brought into contact with the second valve 27, any displacement of the position where the second valve 27 is press-fitted to the valve shaft in the direction of the axis of the valve shaft (i.e., the direction of the swaging) can be prevented. Therefore, the second valve 27 is prevented from disconnecting in a downward direction from the second large-diameter portion by the deformed part R of the second large-diameter portion 29b which has become deformed because of the swaging, and is also prevented from disconnecting in an upward direction from the second large-diameter portion by the second valve stopper 30b.

Next, as shown in FIG. 7, after the valve shaft 29 is removed from the first jig 49 and second jig 51 shown in FIG. 5, the valve shaft is incorporated into the valve housing 9 by way of the opening for part assembly 41 again. Since the distance L1 in the valve housing 9 and the distance L2 of the valve shaft 29 are set so as to be equal to each other, both the amount of valve seat leakage defined between the first valve seat 21 and the first valve 25 and the amount of valve seat leakage defined between the second valve seat 23 and the second valve 27 are set to zero.

Next, as shown in FIG. 8, the compression spring 39 is arranged so as to surround the valve shaft 29 which protrudes within the upper portion of the valve housing 9, and the spring bearing 37 is secured to the upper end of the valve shaft 29, so that the valve shaft 29 is placed in an energized state in which it is energized toward the direction of the arrow A according to the energizing force by the compression spring 39. Then, after a motor shaft (not shown) of the actuator 5 is secured to the upper end of the valve shaft 29, the actuator 5 is fastened to the upper portion of the valve housing 9 and the blocking member 43 is attached to the opening for part assembly 41 with the screws 45. The assembly of the gas-mass-flow control valve is thus completed.

As mentioned above, the assembly method according to this embodiment 1 includes the step of press-fitting the second valve 27 to the valve shaft 29 to which the first valve 25 is press-fitted and secured while measuring and adjusting the distance L2 so that the distance L2 becomes equal to the distance L1. Therefore, the present embodiment offers an advantage of being able to adjust the amount of valve seat leakage in each of the first and second valves 25 and 27 with a high degree of accuracy even when components, such as the valves and valve seats, are manufactured by using sintering machining or the like with low cost, but a low degree of accuracy of dimension compared with form turning, thereby remarkably improving the reliability of the assembled exhaust gas recirculating valve 1. Therefore, the present embodiment offers another advantage of being able to accommodate variations in the size of each of the components, such as the valves and valve seats, and errors that occur in the assembly of these components, and therefore to use the components just as they are even if they are manufactured with a low degree of accuracy of dimension by using sintering machining or the like, thereby improving the yields of the gas-mass-flow control valve.

According to this embodiment 1, the first and second valves 25 and 27 are press-fitted to the valve shaft 29. Therefore, the present embodiment offers a further advantage of being able to suitably adjust the positions where the first and second valves 25 and 27 are secured to the valve shaft 29 to arbitrary ones, respectively, i.e., to adjust the amount of valve seat leakage in each of the first and second valves 25 and 27 according to the use of the gas-mass-flow control valve, e.g., a customer demand even when the gas-mass-flow control valve is applied to a diesel engine in which there is a large difference in pressure between the inlet and outlet of each valve and there is a relatively large flow rate of exhaust gas or even when the gas-mass-flow control valve is applied to a gasoline engine in which there is a relatively small flow rate of exhaust gas.

According to this embodiment 1, oil is placed between the valve shaft 29 and each of the first valve 25 and second valve 27 when each of the first and second valves 25 and 27 is press-fitted to the valve shaft 29. Therefore, the oil serves as lubrication which prevents galling between the valve shaft 29 and each of the first valve 25 and second valve 27 during the press-fitting step. Especially, in a case where the gas-mass-flow control valve is an exhaust gas recirculating one, the hot exhaust gas causes the oil to evaporate when recirculated, and the evaporated oil causes baking in the press-fitted portion of the valve shaft 29 to which each of the first and second valves 25 and 27 is press-fitted. The present invention thus offers a still further advantage of being able to increase the joining force that occurs in the press-fitted portion.

In accordance with this embodiment 1, knurling machining or the like can be performed on both the press-fitted portion of the first large-diameter portion 29a of the valve shaft 29 to which the first valve 25 is press-fitted, and the press-fitted portion of the second large-diameter portion 29b to which the second valve 27 is press-fitted. This variant offers an advantage of being able to remarkably increase the joining force that occurs in each of those press-fitted portions compared with a case where no knurling machining is performed on both the press-fitted portions.

According to this embodiment 1, the assembly method includes the step of swaging a part of the first large-diameter portion 29a of the valve shaft 29 which is distant from the first valve 25 press-fitted to the first large-diameter portion 29a after the step of press-fitting the first valve 25 to the valve shaft. The present embodiment offers another advantage of being able to certainly prevent axial movements of the first valve 25 because of this swaging, and to eliminate the influence of the deformed part of the first large-diameter portion of the valve shaft 29 upon the press-fitted position (i.e., the secured position) where the first valve 25 is press-fitted to the valve shaft by preventing the deformed part from being into contact with the first valve 25 even when swaging the first valve 25 and valve shaft 29 together in the direction of the axis of the valve shaft 29.

According to this embodiment 1, the assembly method includes the step of swaging a part of the second large-diameter portion 29b of the valve shaft 29 which is distant from the second valve 27 press-fitted to the second large-diameter portion 29b after the step of press-fitting the second valve 27 to the valve shaft. The present embodiment offers a further advantage of being able to certainly prevent axial movements of the second valve 27 because of this swaging, and to eliminate the influence of the deformed part of the second large-diameter portion of the valve shaft 29 upon the press-fitted position (i.e., the secured position) where the second valve 27 is press-fitted to the valve shaft by preventing the deformed part from being into contact with the second valve 27 even when swaging the second valve 27 and valve shaft 29 together in the direction of the axis of the valve shaft 29.

According to this embodiment 1, the first large-diameter portion 29a of the valve shaft 29 has the first valve stopper 30a having a larger outside diameter than the first large-diameter portion 29a. Therefore, the present embodiment offers a further advantage of being able to certainly prevent axial movements of the first valve 25 by means of the first valve stopper 30a.

According to this embodiment 1, the second large-diameter portion 29b of the valve shaft 29 has the second valve stopper 30b having a larger outside diameter than the second large-diameter portion 29b. Therefore, the present embodiment offers another advantage of being able to certainly prevent axial movements of the second valve 27 by means of the second valve stopper 30b.

Embodiment 2

Figure 9:
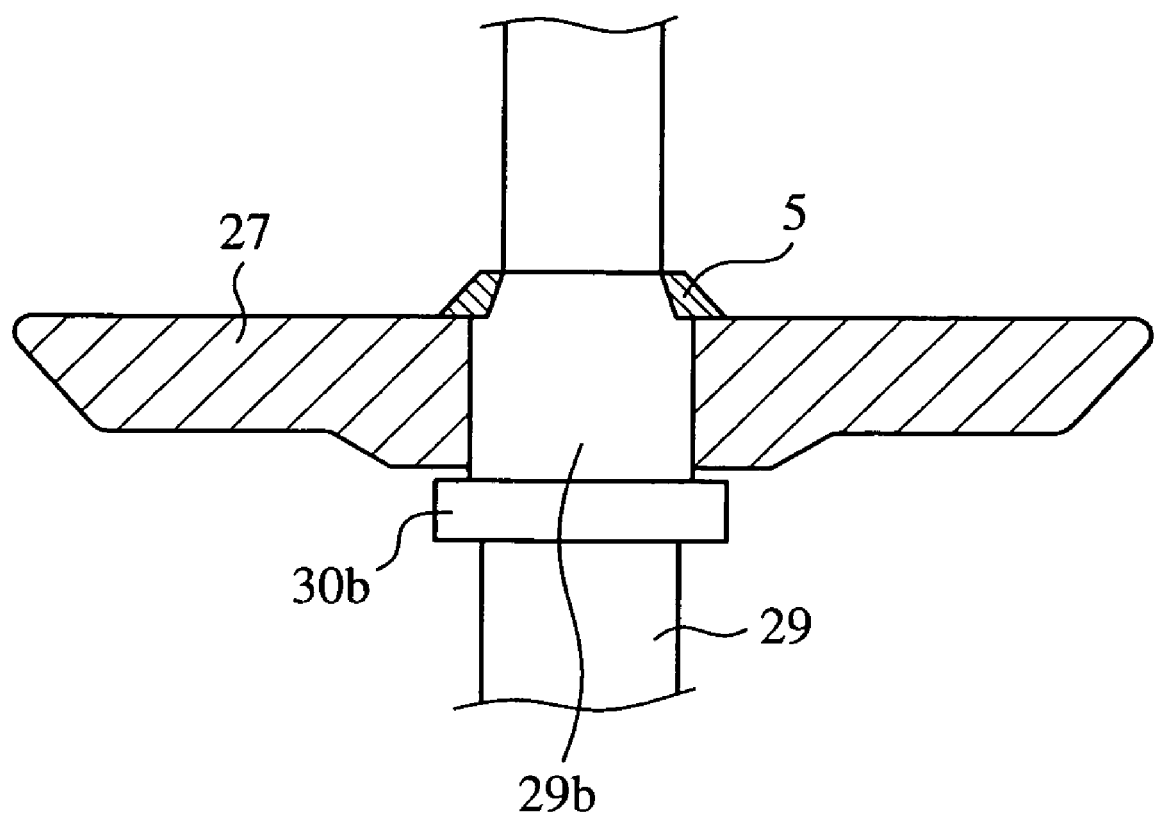
FIG. 9 is a front elevation showing a welding or side caulking step of an assembly method of assembling an exhaust gas recirculating valve in accordance with embodiment 2 of the present invention.

FIG. 9 is a front elevation showing a welding or side caulking step of an assembly method of assembling an exhaust gas recirculating valve in accordance with embodiment 2 of the present invention. Components of this embodiment 2 which are the same as those of embodiment 1 are designated by the same reference numerals, and the explanation of the components will be omitted hereafter.

The assembly method of this embodiment 2 is characterized in that it includes a step of joining a second large-diameter portion 29b and a second valve 27 together with welding after the step of press-fitting the second valve 27 to the second large-diameter portion 29b of a valve shaft 29, for example, as shown in FIG. 9, in addition to the steps of the assembly method of embodiment 1. It is desirable that a position S where the second large-diameter portion 29b and second valve 27 are welded together is located on a peripheral edge portion of the second large-diameter portion 29b where the second large-diameter portion 29b and second valve 27 are adhered to each other and the second large-diameter portion is exposed to the outside of the valve shaft. TIG (tungsten and inert gas) welding or laser welding, such as YAG (yttrium aluminum garnet) laser, can be suitably selected as the welding, for example. This welding step can be used together with the swaging step of embodiment 1, or can be performed instead of the swaging step.

The application of the above-mentioned welding step is not limited to the joining of the second valve 27 to the second large-diameter portion, and the above-mentioned welding step can be applied to joining of a first valve 25 and a first large-diameter portion 29a of the valve shaft 29.

As mentioned above, the assembly method of according to this embodiment 2 includes the step of joining the second large-diameter portion 29b and second valve 27 with welding. Therefore, this embodiment offers an advantage of being able to further increase a joining force between the second large-diameter portion 29b and second valve 27 which is caused by the press-fitting, thereby remarkably improving the reliability of the assembled exhaust gas recirculating valve 1. Thus, this assembly method can be suitably applied to a valve having a large flow rate or a valve having a large pressure difference. This embodiment offers a further advantage of being able to keep a press-fitted position (i.e., a secured position) where the second valve 27 is press-fitted to the second large-diameter portion 29b and to certainly prevent the second valve 27 from dropping off even when the press-fitted part of the second large-diameter portion 29b to which the second valve 27 is press-fitted is loosened due to dimensional errors, etc., thereby remarkably improving the reliability of the assembled exhaust gas recirculating valve 1.

The assembly method according to this embodiment 2 includes the step of joining the second large-diameter portion 29b and second valve 27 with welding, as previously mentioned. Instead of this welding step, the assembly method according to this embodiment can include a step of performing side caulking on a part of the second large-diameter portion 29b. The side caulking step is to swage a part of the second large-diameter portion 29b in a longitudinal direction, i.e., a direction (e.g., a direction of the radius of the valve shaft) which crosses an axis of the valve shaft. A position where a part of the second large-diameter portion 29b is swaged is the same as that in the swaging step of embodiment 1. In this case, since any part of the second large-diameter portion 29b is not swaged in the direction of the axis of the valve shaft, the position where a part of the second large-diameter portion 29b is swaged can be brought close to the second valve 27 as much as possible, to such an extent that the deformed part (not shown) of the second large-diameter portion is not brought into contact with the second valve 27, and therefore the length of the second large-diameter portion 29b in the direction of the axis of the valve shaft can be reduced. The present embodiment thus offers another advantage of being able to reduce the amount of press-fitting of the second valve to the second large-diameter portion. This results in reduction of the time required to perform the press-fitting step and hence reduction of the time required to assemble the exhaust gas recirculating valve.

This embodiment 2 offers a still further advantage of being able to further increase the joining force between the first large-diameter portion 29a and the first valve 25 which is caused by the press-fitting of the first valve 25 to the first large-diameter portion 29a, as in the case of the second valve 27, by applying welding to the joining of the first valve 25 and first large-diameter portion 29a. Also in this case, a press-fitted position where the first valve 25 is press-fitted to the first large-diameter portion can be kept and the first valve 25 can be prevented from dropping off even when the press-fitted part of the first large-diameter portion 29a to which the first valve 25 is press-fitted is loosened due to dimensional errors, etc.

The assembly method according to this embodiment 2 can include a step of performing side caulking on a part of the first large-diameter portion 29a, instead of the above-mentioned welding step. In this case, since any part of the first large-diameter portion 29a is not swaged in the direction of the axis of the valve shaft, the position where a part of the first large-diameter portion 29a is swaged can be brought close to the first valve 25 as much as possible, to such an extent that the deformed part (not shown) of the first large-diameter portion is not brought into contact with the first valve 25, and therefore the length of the first large-diameter portion 29a in the direction of the axis of the valve shaft can be reduced. The present embodiment thus offers a further advantage of being able to reduce the amount of press-fitting of the first valve to the first large-diameter portion. This results in reduction of the time required to perform the press-fitting step and hence reduction of the time required to assemble the exhaust gas recirculating valve.

INDUSTRIAL APPLICABILITY

As mentioned above, the assembly method of assembling a gas-mass-flow control valve in accordance with the present invention is suitable for gas-mass-flow control valves which are to be arranged in an exhaust gas recirculating path via which an exhaust gas from the combustion chamber of an internal combustion engine is returned to the combustion chamber.

The invention claimed is:

1. An assembly method of assembling a gas-mass-flow control valve including a valve housing having an inlet for accepting a gas and an outlet for discharging the gas, a primary channel formed in said valve housing in a vicinity of said inlet, two secondary channels that branch off from said primary channel and that are communicated with said outlet, first and second channel openings that are formed between said two secondary channels and said primary channel, respectively, first and second valves that open or close said two channel openings simultaneously by way of first and second valve seats which are disposed in said two channel openings, respectively, a valve shaft having said first and second valves, and an actuator that causes said valve shaft to reciprocate in a direction of an axis of said valve housing, said assembly method comprising the steps of:
   press-fitting said first valve seat to a valve seat press-fitted portion of said first channel opening on a side of said actuator;
   placing oil between an outer surface of a first large-diameter portion of said valve shaft and an inner surface of said first valve;
   press-fitting said first valve to said first large-diameter portion of said valve shaft;
   incorporating said valve shaft into said valve housing temporarily;
   measuring a distance L1 between a position of said first valve on a side of said primary channel and a position of a valve seat press-fitted portion of said second channel opening on a side of said primary channel in a state in which said valve shaft to which said first valve is press-fitted is temporarily incorporated into said valve housing so that said first valve is adhered to said first valve seat;
   taking out said valve shaft from said valve housing temporarily;
   placing oil between an outer surface of a second large-diameter portion of said valve shaft and an inner surface of said second valve after the taking out said valve shaft from said valve housing;
   while measuring a distance L2 between a position corresponding to said first valve on the side of said primary channel and a position corresponding to said second valve seat on the side of said primary channel, press-fitting said second valve to said second large-diameter portion of said valve shaft in a state in which said second valve seat is placed in said second large-diameter portion of said valve shaft so that said distance L2 becomes equal to said distance L1, only when an amount of leakage in said second valve seat at ordinary temperatures is set to 0;
   press-fitting said second valve seat to said valve seat press-fitted portion of said second channel opening which is distant from said actuator; and
   incorporating said valve shaft into said valve housing to complete the assembly.

2. The assembly method of assembling the gas mass flow control valve according to claim 1, characterized in that said assembly method includes the step of swaging a part of said first large-diameter portion of said valve shaft which is distant from said first valve press-fitted into said first large-diameter portion after the step of press-fitting said first valve.

3. The assembly method of assembling the gas mass flow control valve according to claim 1, characterized in that said assembly method includes the step of swaging a part of said second large-diameter portion of said valve shaft which is distant from said second valve press-fitted into said second large-diameter portion after the step of press-fitting said second valve.

4. The assembly method of assembling the gas mass flow control valve according to claim 2, characterized in that said first large-diameter portion of said valve shaft has a first valve stopper having a larger outside diameter than said first large-diameter portion.

5. The assembly method of assembling the gas mass flow control valve according to claim 3, characterized in that said second large-diameter portion of said valve shaft has a second valve stopper having a larger outside diameter than said second large-diameter portion.

6. The assembly method of assembling the gas mass flow control valve according to claim 2, characterized in that said step of swaging the part of said first large-diameter portion of said valve shaft is carried out using a side caulking process of swaging said part of said first large-diameter portion in a direction crossing a direction of an axis of said valve shaft.

7. The assembly method of assembling the gas mass flow control valve according to claim 3, characterized in that said step of swaging the part of said second large-diameter portion of said valve shaft is carried out using a side caulking process of swaging said part of said second large-diameter portion in a direction crossing a direction of an axis of said valve shaft.

8. The assembly method of assembling the gas mass flow control valve according to claim 2, characterized in that said assembly method includes the step of joining said first large-diameter portion of said valve shaft and said first valve press-fitted to said first large-diameter portion together with welding.

9. The assembly method of assembling the gas mass flow control valve according to claim 3, characterized in that said assembly method includes the step of joining said second large-diameter portion of said valve shaft and said second valve press-fitted to said second large-diameter portion together with welding.

10. The assembly method of assembling the gas mass flow control valve according to claim 1, wherein the steps are performed in the order recited therein.

11. The assembly method of assembling the gas mass flow control valve according to claim 1, wherein the measuring the distance L2 and the press-fitting said second valve to said second large-diameter portion of said valve shaft in the state in which said second valve seat is placed in said second large-diameter portion of said valve shaft so that said distance L2 becomes equal to said distance L1 are performed after the taking out said valve shaft from said valve housing.

12. The assembly method of assembling the gas mass flow control valve according to claim 1, wherein the measuring a distance L1 is performed before the press-fitting said second valve to said second large-diameter portion of said valve shaft.

13. The assembly method of assembling the gas mass flow control valve according to claim 1, further comprising comparing the distance L2 with the distance L1, while the measuring the distance L2 and while the press-fitting said second valve to said second large-diameter portion of said valve shaft in the state in which said second valve seat is placed in said second large-diameter portion of said valve shaft, so that said distance L2 becomes equal to said distance L1.

14. The assembly method of assembling the gas mass flow control valve according to claim 13, the measuring the distance L2 and the press-fitting said second valve to said second large-diameter portion of said valve shaft in the state in which said second valve seat is placed in said second large-diameter portion of said valve shaft is continuously performed until L2 becomes equal to said distance L1.

* * * * *